United States Patent
Paielli (10) Patent No.: US 10,648,385 B2
(45) Date of Patent: May 12, 2020

(54) DIESEL EXHAUST FLUID PRESSURE MEASURING AND CONTROL SYSTEMS AND METHODS

(71) Applicant: Tenneco Automotive Operating Company Inc., Lake Forest, IL (US)

(72) Inventor: Perry Paielli, Commerce Township, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 180 days.

(21) Appl. No.: 15/890,409

(22) Filed: Feb. 7, 2018

(65) Prior Publication Data

US 2019/0242284 A1  Aug. 8, 2019

(51) Int. Cl.
  *F01N 3/20* (2006.01)
  *B01D 53/94* (2006.01)
  *B01D 53/90* (2006.01)

(52) U.S. Cl.
  CPC ............. *F01N 3/208* (2013.01); *B01D 53/90* (2013.01); *B01D 53/944* (2013.01); *B01D 53/9418* (2013.01); *B01D 53/9477* (2013.01); *B01D 53/9495* (2013.01); *B01D 2251/2067* (2013.01); *B01D 2255/904* (2013.01); *F01N 2610/02* (2013.01); *F01N 2610/144* (2013.01); *F01N 2900/0408* (2013.01); *F01N 2900/1808* (2013.01); *F01N 2900/1822* (2013.01)

(58) Field of Classification Search
  CPC .......... B01D 2255/904; B01D 53/9418; B01D 53/944; B01D 53/9477; B01D 53/9495; F01N 2610/02; F01N 2610/144; F01N 2900/0408; F01N 2900/1808; F01N 2900/1822; F01N 3/208
  See application file for complete search history.

(56) References Cited

U.S. PATENT DOCUMENTS

| | | | |
|---|---|---|---|
| 6,085,727 A | 7/2000 | Nakano | |
| 8,635,854 B2 | 1/2014 | Shovels et al. | |

(Continued)

FOREIGN PATENT DOCUMENTS

| | | | |
|---|---|---|---|
| CN | 102182574 A | 9/2011 | |
| DE | 102010044923 A1 | 4/2012 | |

(Continued)

*Primary Examiner* — Audrey K Bradley
*Assistant Examiner* — Anthony Ayala Delgado
(74) *Attorney, Agent, or Firm* — Harness, Dickey & Pierce, P.L.C.

(57) ABSTRACT

A DEF injector is configured to inject DEF into an exhaust system of a vehicle. A DEF pump includes an electric motor configured to drive a compression mechanism and pumps the DEF to the DEF injector. A pressure sensor is configured to measure a pressure of the DEF output from the DEF pump. A sampling module is configured to, based on a rotational position of an output shaft of the electric motor, selectively output samples of the pressure. A measurement module is configured to determine a measured pressure at the pressure sensor based on a present one of the samples and a last one of the samples output before the present one of the samples. A pump control module is configured to apply power from a power source to the electric motor based on a difference between the measured pressure and a target pressure.

20 Claims, 8 Drawing Sheets

(56) References Cited

U.S. PATENT DOCUMENTS

2009/0291000 A1* 11/2009 Saga .................... F04C 2/3442
  417/364
2017/0093312 A1* 3/2017 Hano .................... H02P 6/085

FOREIGN PATENT DOCUMENTS

GB          250309 A    4/1926
JP       2000045824 A   2/2000

* cited by examiner

DIESEL EXHAUST FLUID PRESSURE MEASURING AND CONTROL SYSTEMS AND METHODS

FIELD

The present disclosure relates to exhaust aftertreatment for an internal combustion engine and, more particularly, to diesel exhaust fluid pressure measurement and control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

To reduce the quantity of undesirable particulate matter and nitrogen oxides (NOx) emitted to the atmosphere during internal combustion engine operation, a number of exhaust aftertreatment systems have been developed. A need for exhaust aftertreatment systems particularly may arise when diesel combustion processes are implemented.

One method used to reduce NOx emissions from internal combustion engines is known as selective catalytic reduction (SCR). SCR may include injecting a diesel exhaust fluid (DEF), such as urea, into the exhaust stream of the engine to form a DEF and exhaust gas mixture that is subsequently passed through a reactor containing an SCR catalyst. The SCR catalyst is configured to reduce the NOx concentration in the presence of the ammonia from the DEF. For example only, the SCR catalyst may include activated carbon or metals, such as platinum, vanadium, or tungsten.

SUMMARY

In a feature, a diesel emissions fluid (DEF) control system is described. A DEF injector is configured to inject DEF into an exhaust system of a vehicle. A DEF pump includes an electric motor configured to drive a compression mechanism and pumps the DEF to the DEF injector. A pressure sensor is configured to measure a pressure of the DEF output from the DEF pump. A sampling module is configured to, based on a rotational position of an output shaft of the electric motor, selectively output samples of the pressure. A measurement module is configured to determine a measured pressure at the pressure sensor based on a present one of the samples and a last one of the samples output before the present one of the samples. A pump control module is configured to apply power from a power source to the electric motor based on a difference between the measured pressure and a target pressure.

In further features, the measurement module is configured to set the measured pressure to an average of the present one of the samples and the last one of the samples.

In further features, the measurement module is configured to set the measured pressure to: (a) a sum of the present one of the samples and the last one of the samples divided by (b) two.

In further features, the measurement module is configured to determine the measured pressure at the pressure sensor based on the present one of the samples, the last one of the samples, a first previous one of the samples output immediately before the last one of the samples, and a second previous one of the samples output immediately before the first previous one of the samples.

In further features, the measurement module is configured to determine the measured pressure at the pressure sensor based on the present one of the samples, the last one of the samples, a first previous one of the samples output immediately before the last one of the samples, a second previous one of the samples output immediately before the first previous one of the samples, a third previous one of the samples output immediately before the second previous one of the samples, and a fourth previous one of the samples output immediately before the third previous one of the samples.

In further features, the measurement module is configured to set the measured pressure at the pressure sensor to an average of: (i) the present one of the samples, (ii) the last one of the samples, (iii) the first previous one of the samples output immediately before the last one of the samples, (iv) the second previous one of the samples output immediately before the first previous one of the samples, (v) the third previous one of the samples output immediately before the second previous one of the samples, and (vi) the fourth previous one of the samples output immediately before the third previous one of the samples.

In further features, the sampling module is configured to output the samples of the pressure when the rotational position of the output shaft of the electric motor reaches a plurality of predetermined positions, respectively, during a revolution of the electric motor.

In further features, the predetermined positions correspond to high and low peaks in the pressure.

In further features, the sampling module is configured to output six of the samples of the pressure when the rotational position of the output shaft of the electric motor reaches six predetermined positions, respectively, during a revolution of the electric motor.

In further features, the sampling module is configured to output one of the samples of the pressure each 60 degrees of rotation of the rotational position of the output shaft of the electric motor.

In further features, a position sensor is configured to measure the rotational position of the output shaft of the electric motor.

In further features: a speed module is configured to determine a rotational speed of the electric motor based on the rotational position of the output shaft of the electric motor; an adjustment module is configured to determine a frequency adjustment based on the rotational speed of the electric motor; and an adjusting module is configured to determine an adjusted frequency based on a predetermined frequency and the frequency adjustment. The sampling module is configured to output the samples of the pressure at the adjusted frequency.

In further features, the pump control module is configured to apply power from the power source to the electric motor based on adjusting the difference toward or to zero.

In a feature, a diesel emissions fluid (DEF) control method includes: by a DEF injector, injecting DEF into an exhaust system of a vehicle; by a DEF pump that includes an electric motor configured to drive a compression mechanism, pumping the DEF to the DEF injector; by a pressure sensor, measuring a pressure of the DEF output from the DEF pump; based on a rotational position of an output shaft of the electric motor, selectively outputting samples of the pressure; determining a measured pressure at the pressure sensor based on a present one of the samples and a last one of the samples output before the present one of the samples;

and applying power from a power source to the electric motor based on a difference between the measured pressure and a target pressure.

In further features, determining the measured pressure at the pressure sensor includes setting the measured pressure to an average of the present one of the samples and the last one of the samples.

In further features, determining the measured pressure at the pressure sensor includes setting the measured pressure at the pressure sensor to an average of: (i) the present one of the samples, (ii) the last one of the samples, (iii) a first previous one of the samples output immediately before the last one of the samples, (iv) a second previous one of the samples output immediately before the first previous one of the samples, (v) a third previous one of the samples output immediately before the second previous one of the samples, and (vi) a fourth previous one of the samples output immediately before the third previous one of the samples.

In further features, selectively outputting samples of the pressure includes outputting the samples of the pressure when the rotational position of the output shaft of the electric motor reaches a plurality of predetermined positions, respectively, during a revolution of the electric motor.

In further features the DEF control method further includes, by a position sensor, measuring the rotational position of the output shaft of the electric motor.

In further features, applying power from the power source to the electric motor includes applying power from the power source to the electric motor based on adjusting the difference toward or to zero.

In further features the DEF control method further includes: determining a rotational speed of the electric motor based on the rotational position of the output shaft of the electric motor; determining a frequency adjustment based on the rotational speed of the electric motor; and determining an adjusted frequency based on a predetermined frequency and the frequency adjustment, where selectively outputting samples of the pressure includes outputting the samples of the pressure at the adjusted frequency.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A diesel exhaust fluid (DEF) pump pumps DEF to a DEF injector. The DEF injector injects DEF into an exhaust system of an engine to reduce the amount of one or more constituents of the exhaust (e.g., nitrogen oxides (NOx)) before the exhaust is released to atmosphere.

The DEF pump includes an electric motor, such as a brushless direct current (DC) motor. The electric motor drives a compression mechanism of the DEF pump to pump DEF to the DEF injector. The output of the DEF pump and the pressure of the DEF supplied to the DEF injector are therefore related to the speed of the motor. For example, output of the DEF pump increases as the speed of the motor increases and vice versa. The relationship between output and speed, however, may not be linear.

A pressure sensor measures a pressure of DEF output by the pump and input to the DEF injector. A control module controls a speed of the DEF pump by controlling the application of power to the electric motor. The control module controls the speed of the electric motor based on adjusting the pressure of the DEF to a target pressure. More specifically, the control module increases the speed of the electric motor to increase the pressure toward or to the target pressure when the pressure is less than the target pressure. The control module decreases the speed of the electric motor to decrease the pressure toward or to the target pressure when the pressure is greater than the target pressure.

Commutation of the electric motor, however, causes periodic fluctuations in the output of the DEF pump. More specifically, the construction of the motor and commutation of the motor (e.g., using a trapezoidal, sinusoidal, or another shaped signal) causes fluctuations in the torque output of the electric motor. Fluctuations in the torque output of the electric motor cause fluctuations in the output of the DEF pump. The torque fluctuations attributable to commutation of the electric motor may be referred to as cogging torque. The fluctuations in the output of the DEF pump are reflected in the pressure measured by the pressure sensor.

The fluctuations in the pressure of the DEF measured by the pressure sensor could cause inaccuracy in the control of the speed of the electric motor and/or inaccuracy in DEF flow to the DEF injector. According to the present disclosure, a control module samples the pressure measured by the pressure sensor when the position of the electric motor is at predetermined positions corresponding to the fluctuations. The peaks of the torque fluctuations (and pressure fluctuations) occur at the predetermined positions. For example, the control module may sample the pressure every 60 degrees of motor rotation for one type of electric motor. The control module averages two or more consecutive samples to determine the pressure of the DEF. Based on this pressure, the control module controls the DEF pump to more closely and accurately control the pressure to the target pressure.

Figure 1:
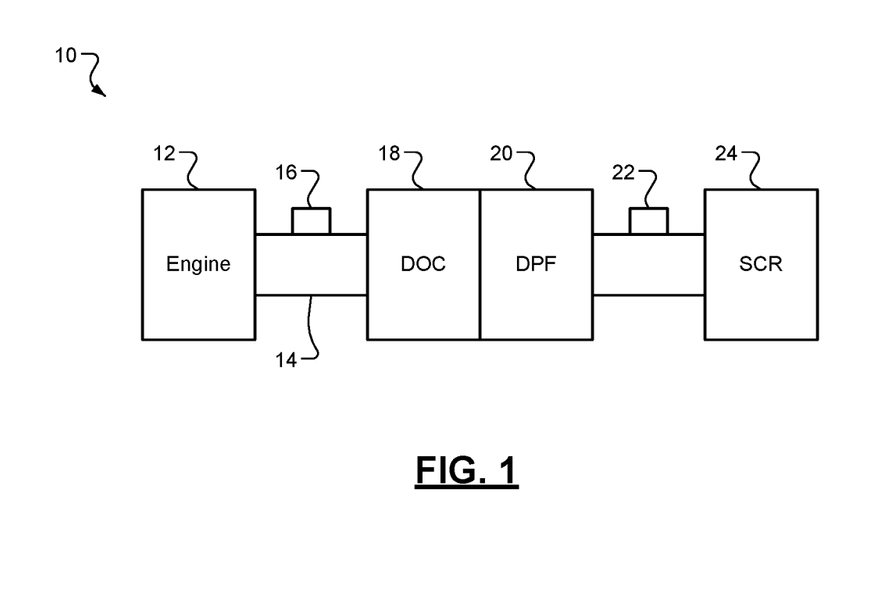
FIG. 1 includes a functional block diagram of an example exhaust gas aftertreatment system.

FIG. 1 includes a functional block diagram of an exhaust gas aftertreatment system 10 for treating the exhaust output from a diesel internal combustion engine 12 in an exhaust (gas) passageway 14. The exhaust gas aftertreatment system 10 may include a first fluid delivery system 16, a diesel oxidation catalyst (DOC) 18, a diesel particulate filter (DPF) 20, a second fluid delivery system 22, and a selective catalytic reduction (SCR) catalyst 24. While FIG. 1 depicts only the engine 12 discharging exhaust gas into the exhaust passageway 14, in some embodiments, a plurality of internal combustion engines may discharge exhaust gas into the exhaust passageway 14 so that the exhaust gas aftertreatment system 10 collectively treats exhaust gas from multiple internal combustion engines. Multiple internal combustion engines may operate concurrently and/or independently of each other.

The first fluid delivery system 16 may spray diesel fuel (or another type of hydrocarbon or fuel) into the exhaust stream at or upstream of the DOC 18. The second fluid delivery system 22 may spray urea (or another type of DEF) into the exhaust stream at or upstream of the SCR catalyst 24. While an example orientation of components is provided in FIG. 1, the positioning of one or more components of the exhaust gas aftertreatment system 10 may be different than the positioning shown in the example of FIG. 1. The present disclosure is also applicable to exhaust gas aftertreatment systems having components positioned differently.

Figure 2:
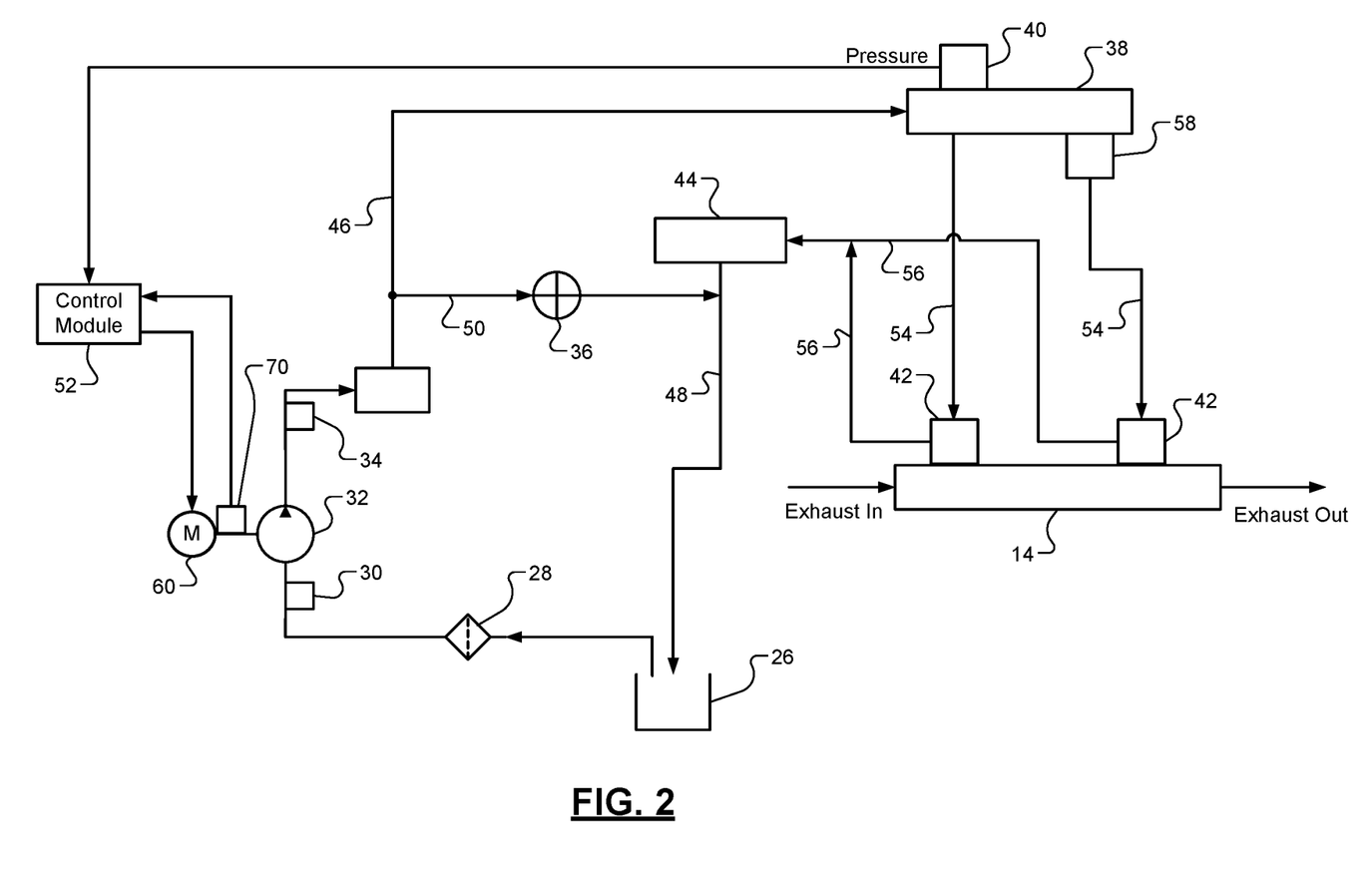
FIG. 2 includes a functional block diagram of an example pump control system.

FIG. 2 includes a functional block diagram of an example fuel delivery system. Either or both of the first and second fluid delivery systems 16, 22 may be configured as shown in FIG. 2. While the example of the second fluid deliver system 22 will be discussed, the following description may also apply to the first fluid delivery system 16.

As shown in FIG. 2, the fluid delivery system may include a tank 26, a filter 28, a temperature sensor 30, a pump 32, a first pressure sensor 34, a bypass valve 36, one or more supply manifolds 38, a second pressure sensor 40, one or more injectors 42 and one or more return manifolds 44. The tank 26 stores the DEF. The pump 32 draws the DEF from the tank 26 and pumps the fluid to a supply passageway 46. The DEF flows into the tank 26 from a return passageway 48. The tank 26 may also include one or more other passes for inputting the DEF to the tank 26, such as DEF input by a user. A bypass passageway 50 may directly fluidly connect the supply passageway 46 with the return passageway 48.

The fluid delivery system of FIG. 2 is illustrated as including two injectors 42. However, the fluid delivery system may include a different number of injectors including one injector or more than two injectors. The fluid delivery system could include one or more injectors 42 that inject DEF into separate exhaust passageways 14 that correspond to different engines.

The pump 32 may draw the DEF from the tank 26 through the filter 28. The temperature sensor 30 may measure a temperature of the DEF flowing from the tank 26, generate a temperature signal corresponding to the temperature, and output the temperature signal to a control module 52. The first pressure sensor 34 measures a first pressure of the DEF in the supply passageway 46. The first pressure sensor 34 generates a first pressure signal corresponding to the first pressure and outputs the first pressure signal to the control module 52.

Some or all of the fluid from the supply passageway 46 may flow into the supply manifold 38. The second pressure sensor 40 measures a second pressure of the DEF in the supply manifold 38. The second pressure sensor 40 generates a second pressure signal corresponding to the second pressure, and outputs the second pressure signal to the control module 52.

The injectors 42 may receive the DEF from the supply manifold 38 via supply lines 54. In various implementations, one or more urea quality sensors, such as urea quality sensor 58, may be disposed along one or more supply lines 54. The urea quality sensor 58 may measure a concentration of a component of the DEF (e.g., a concentration of ammonia in urea) that is being supplied to the injectors 42. The urea quality sensor 58 may generate a quality signal corresponding to the concentration and output the quality signal to the control module 52. In various implementations, the exhaust aftertreatment system may include one or more other sensors.

The injectors 42 inject a first portion of the DEF flowing through the supply lines 54 into the exhaust passageway 14 and, therefore, the exhaust stream flowing through the exhaust passageway 14. A second (remaining) portion of the DEF at the injectors 42 flows to the return manifold 44 through return lines 56. The DEF flows from the return manifold 44 back to the tank 26 via the return passageway 48.

The control module 52 controls actuation of the bypass valve 36 and the injectors 42 based on the signals from the sensors including the temperature signal, the first and second pressure signals, the quality signal, and the signals from other sensors. The control module 52 (or another control module, as discussed further below) controls the pump 32. For example, the control module 52 may control opening of the injectors 42 to control the amount of DEF that is injected into the exhaust stream based on the temperature signal, the first and second pressure signals, the quality signal, and the signals from other sensors. For example, the control module 52 may determine characteristics of pulse width modulation (PWM) signals to apply to the injectors 42 to achieve a target flow rate of DEF into the exhaust passageway 14. Examples of characteristics include, for example, pulse period (or width), ON time, pulse OFF time, etc.

The control module 52 may control an opening of the bypass valve 36. The bypass valve 36 being open allows a portion of the DEF in the supply passageway 46 to flow directly to the return passageway 48 through the bypass passageway 50. The portion increases as the opening of the bypass valve 36 increases and vice versa.

The control module 52 also controls operation and speed of the pump 32 to adjust a measured pressure of the DEF to a target pressure at the first pressure sensor 34 and/or a target pressure at the second pressure sensor 40. The target pressure may be a fixed value or may be variable. In the example of a variable, the control module 52 may determine the target pressure based on one or more operating parameters, such as (e.g., engine speed, engine load, engine temperature, exhaust gas temperature, and/or exhaust gas flow rate).

The pump 32 is an electrically driven pump including an electric motor 60. The electric motor 60 includes a stator that drives rotation of a rotor. The rotor is fixed to an output shaft of the electric motor 60. The output shaft of the electric motor 60 drives a compression mechanism. For example only, the electric motor 60 may be a brushless direct current (DC) electric motor or another suitable type of electric motor. The pump 32 may be, for example, a positive displacement pump. The control module 52 controls the application of electrical power from a power source, such as a battery, to the electric motor 60.

A position sensor 70 may measure a rotational position (or angle) of the output shaft of the electric motor 60. In various implementations, the position sensor 70 may be omitted, and the rotational position of the output shaft of the electric motor 60 may be estimated based on current and/or voltage of the electric motor 60.

Figure 3A:
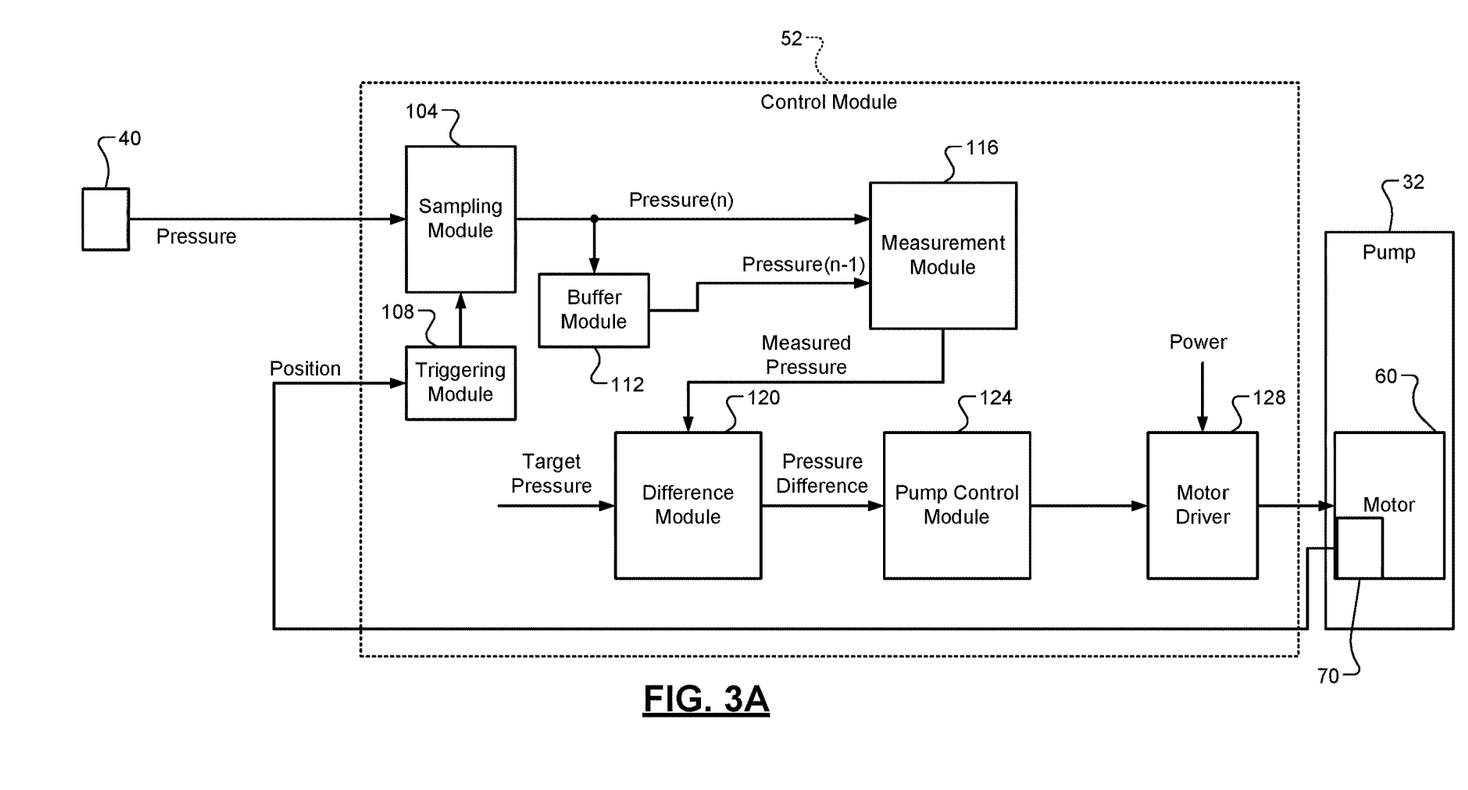
FIGS. 3A-3B are functional block diagrams of example implementations of a pump control system.

FIG. 3A is a functional block diagram of an example implementation of a pump control system. While the following will be described in conjunction with the example of the second pressure sensor 40, the following is also applicable to the use of the first pressure sensor 34.

A sampling module 104 samples the pressure measured by the second pressure sensor 40 when the sampling module 104 is triggered by a triggering module 108. The triggering module 108 triggers the sampling module 104 each time when the position of the electric motor 60 reaches one of a plurality of predetermined positions. The position of the electric motor 60 may be measured using the position sensor 70. Alternatively, the control module 52 may include an estimation module that estimates the position using one or more lookup tables and/or equations that relate voltage and/or current of the electric motor 60 to position.

The plurality of predetermined positions may be equidistantly spaced per revolution (i.e., 360 degrees of rotation) of the electric motor 60. The number of predetermined positions is based on characteristics of the electric motor 60, such as the number of magnetic poles of the electric motor 60 and the number of teeth of a stator of the electric motor 60. The characteristics of the electric motor 60 dictate the frequency of the periodic torque fluctuations of the electric motor 60 associated with commutation of the electric motor 60. The number of predetermined positions may be set to two times the number of torque fluctuation cycles per revolution of the electric motor 60.

For example, six (6) predetermined positions may be 60 degrees apart and may be 60 degrees, 120 degrees, 180 degrees, 240 degrees, 300 degrees, and 360 degrees. In this example, the triggering module 108 triggers the sampling module 104 every 60 degrees of rotation of the electric motor 60 (when the position reaches 60 degrees, 120 degrees, 180 degrees, 240 degrees, 300 degrees, and 360 degrees).

Figure 4:
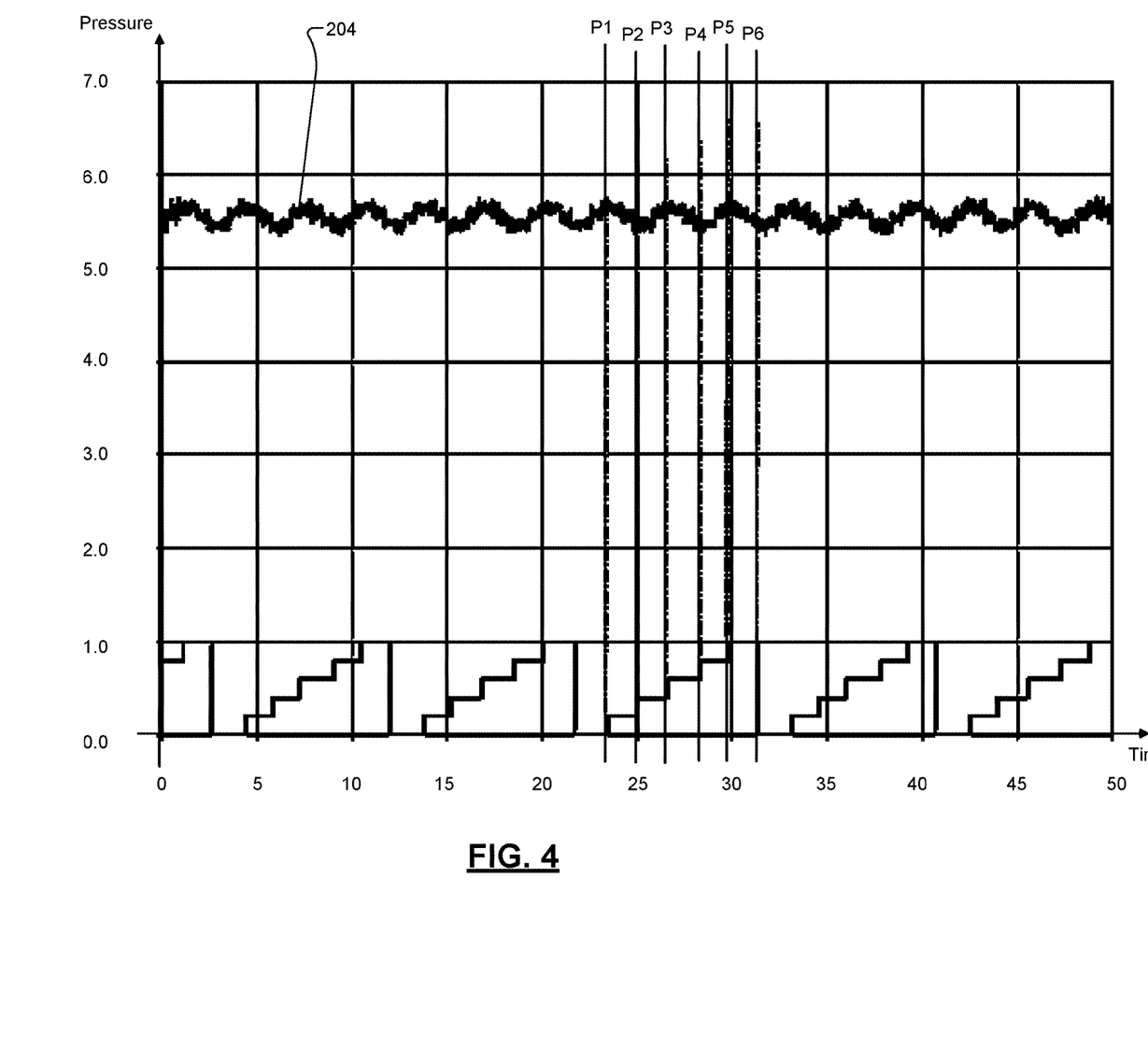
FIG. 4 is an example graph of pressure measured by a pressure sensor versus time.

FIG. 4 includes an example graph of pressure measured by the second pressure sensor 40 versus time. Trace 204 tracks the pressure measured by the second pressure sensor 40. As illustrated, the pressure fluctuates at a predetermined frequency based on the cogging torque of the electric motor 60.

In the example of FIG. 4, the sampling module 104 samples the pressure measured by the second pressure sensor 40 each time that the position of the electric motor 60 reaches a predetermined position (P1-P6) during a revolution of the electric motor 60. High and low peaks in the measured pressure occur at the predetermined positions. The predetermined positions are related to the locations of the magnets of the electric motor 60 and commutation of the electric motor 60. While the predetermined positions P1-P6 are illustrated for one revolution of the electric motor 60, the sampling module 104 samples the pressure at the predetermined positions for each revolution of the electric motor 60.

Referring back to FIG. 3A, the sampling module 104 outputs a pressure sample (pressure (n)) each time that the sampling module 104 is triggered. A buffer module 112 stores and outputs a predetermined number of the last pressure samples output by the sampling module 104 before the present pressure sample (pressure(n)). For example, the buffer module 112 may store and output the last pressure sample (pressure (n-1) output by the sampling module 104 before the present pressure sample (pressure(n)).

Figure 3B:
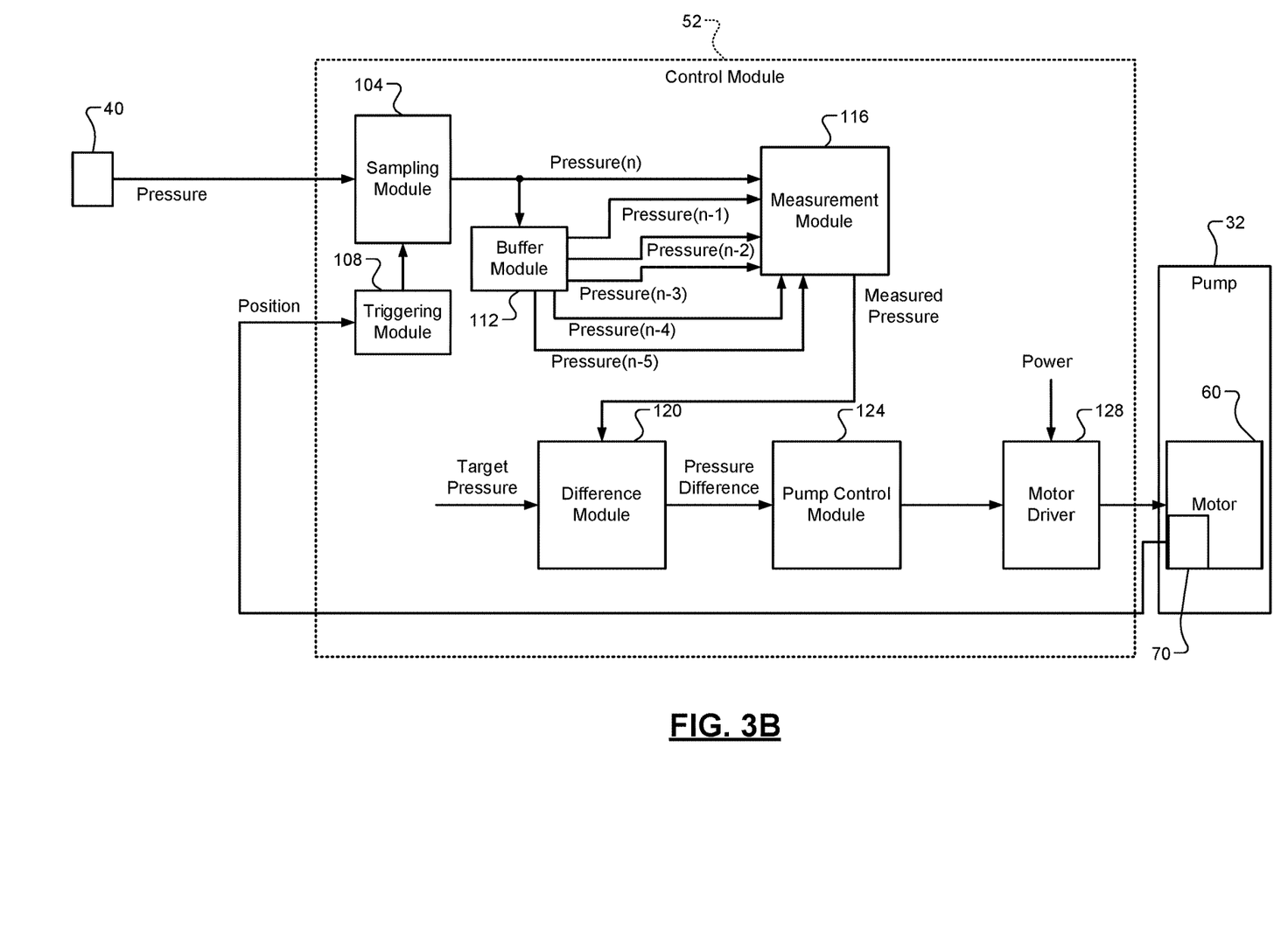

In various implementations, the buffer module 112 may store and output more than one of the last pressure samples output by the sampling module 104 before the present pressure sample (pressure(n)). For example, the buffer module 112 may store and output one less previous pressure sample than the number of predetermined positions used to trigger the sampling module 104. In the example of six predetermined positions, the buffer module 112 may store and output the last pressure sample (pressure (n-1)) output by the sampling module 104 before the present pressure sample (pressure(n)), the pressure sample (pressure (n-2)) output by the sampling module 104 immediately before the last pressure sample (pressure(n-1)), the pressure sample (pressure (n-3)) output by the sampling module 104 immediately before that pressure sample (pressure(n-2)), the pressure sample (pressure (n-4)) output by the sampling module 104 immediately before that pressure sample (pressure(n-3)), and the pressure sample (pressure (n-5)) output by the sampling module 104 immediately before that pressure sample (pressure(n-4)), as illustrated in FIG. 3B. FIG. 3B is also a functional block diagram of an example implementation of a pump control system.

The buffer module 112 may include a ring buffer, a first-in first-out (FIFO) buffer, a shift register, or another suitable type of buffer. The buffer module 112 updates the stored pressure samples each time that the sampling module 104 outputs a pressure sample. While the above examples are provided, the buffer module 112 may store another suitable number of the last pressure samples, such as the last 3, 7, 9, or 11 pressure samples.

A measurement module 116 determines a measured pressure of the DEF at the second pressure sensor 40 based on the present pressure sample (pressure(n)) and the last pressure sample(s) output by the buffer module 112. The measurement module 116 may, for example, set the measured pressure based on or equal to an average of the present pressure sample (pressure(n)) and the last pressure sample(s) output by the buffer module 112. For example only, the measurement module 116 may set the measured pressure using the equation:

$$\text{measured} = \frac{p(n) + p(n-1) + \ldots p(n-m)}{m+1},$$

where measured is the measured pressure, p(n) is the present pressure sample (pressure(n)), p(n-1) is the pressure sample output by the sampling module 104 immediately before the present pressure sample (pressure(n)), p(n-1) is the pressure sample output by the sampling module 104 immediately before the present pressure sample (pressure(n)), and p(n-m) is the pressure sample output by the sampling module 104 m samples immediately before the present pressure sample (pressure(n)), and m is an integer greater than 1. In the example of FIG. 3A, the above equation can be simplified to $$\text{measured} = \frac{p(n) + p(n-1)}{2}.$$

A difference module 120 determines a pressure difference between the target pressure and the measured pressure. For example, the difference module 120 may set the pressure difference based on or equal to the target pressure minus the measured pressure.

A pump control module 124 controls application of power to the electric motor 60 based on adjusting the pressure difference toward or to zero. For example, a motor driver 128 (e.g., an inverter) may include a plurality of switches configured to connect and disconnect individual windings of the electric motor 60 to and from the power source. The pump control module 124 may control switching of the switches of the motor driver 128 based on driving the pressure difference toward or to zero. The pump control module 124 may control switching of the switches, for example, using pulse width modulation (PWM) control. As an example, the pump control module 124 may increase the duty cycle of a PWM signal applied to one or more of the switches when the pressure is less than the target pressure, and vice versa.

Figure 5A:
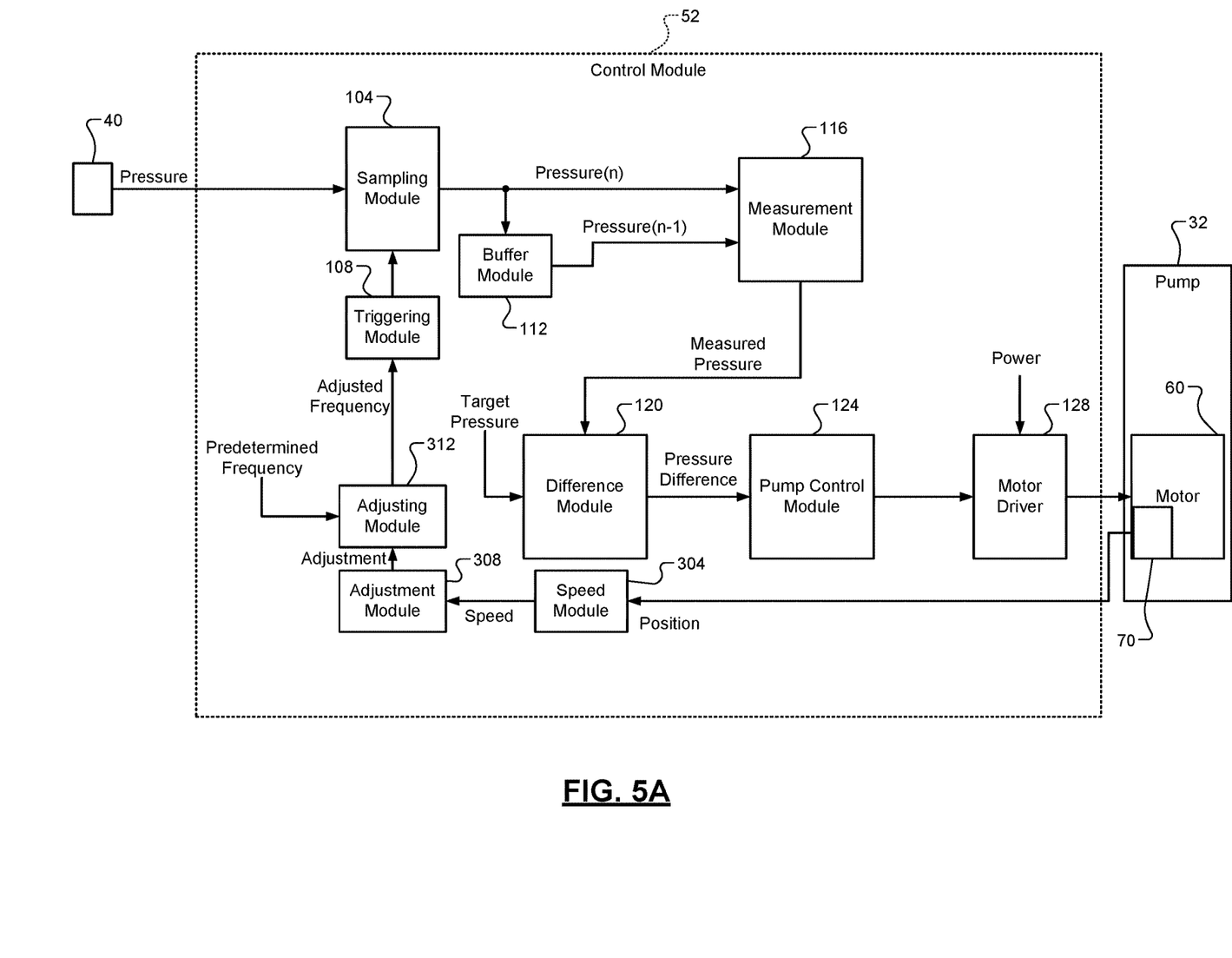
FIGS. 5A-5B are functional block diagrams of example implementations of a pump control system.
Figure 5B:
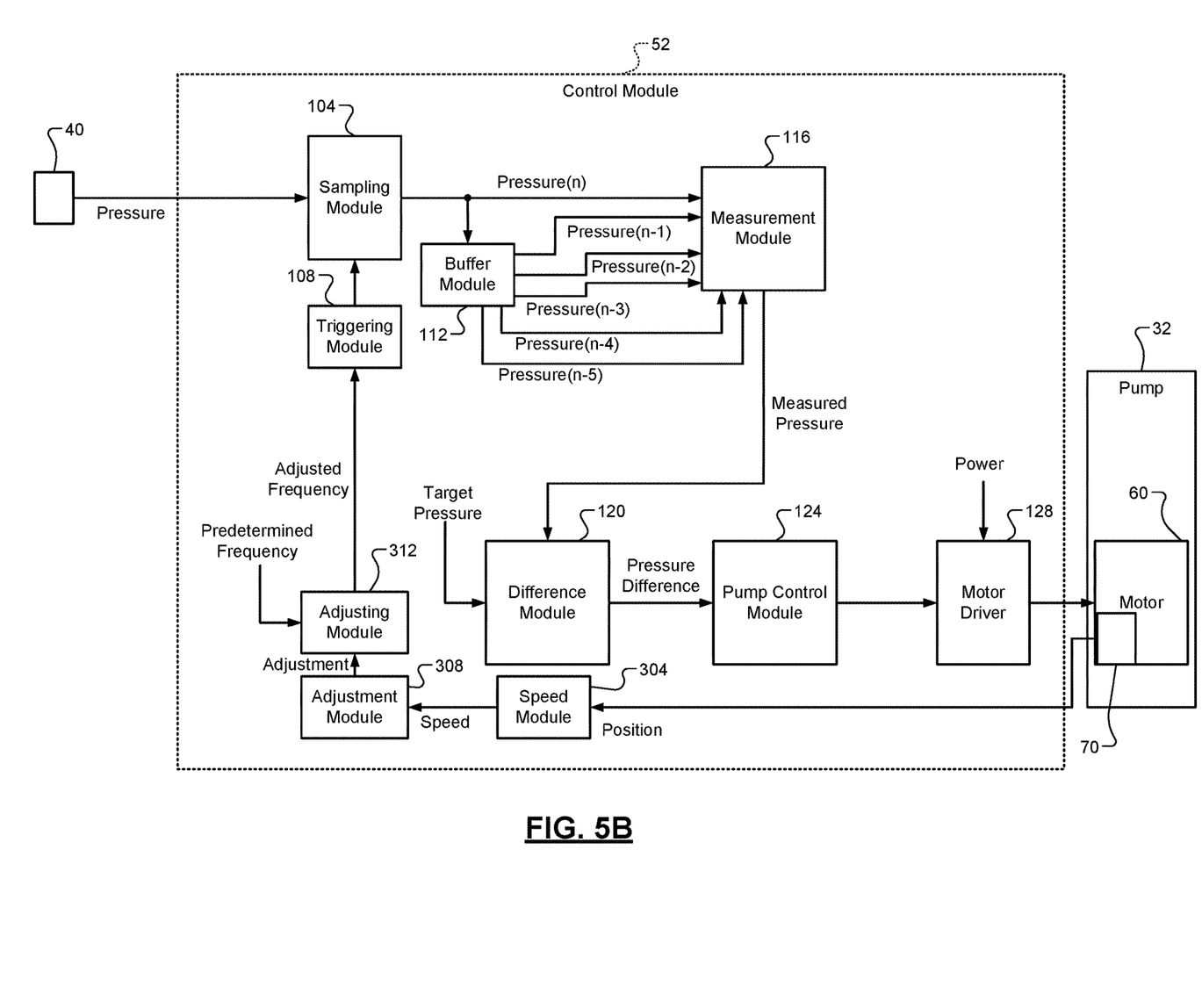

FIGS. 5A and 5B include functional block diagrams of example implementations of a pump control system. The sampling of the pressure from the second pressure sensor 40 may alternatively be synchronized with the position of the electric motor 60 via adjusting a frequency at which the triggering module 108 is triggered.

For example, a speed module 304 may determine a rotational speed of the electric motor 60 based on the position of the electric motor 60. For example, the speed module 304 may determine the speed as a mathematical derivative of the position with respect to time or determine the speed based on a change in the position over each predetermined period.

An adjustment module 308 may determine a frequency adjustment based on the speed. The adjustment module 308 may determine the frequency adjustment using one of a lookup table and an equation that relates speeds to frequency adjustments. For example, the adjustment module 308 may increase the frequency adjustment as the speed increases and vice versa.

An adjusting module 312 may determine an adjusted frequency based on a predetermined frequency and the frequency adjustment. For example, the adjusting module 312 may set the adjusted frequency based on or equal to: (i) the predetermined frequency plus the frequency adjustment; or (ii) the predetermined frequency multiplied by the frequency adjustment. The triggering module 108 may trigger the sampling module 104 at the adjusted frequency.

The triggering module 108 could trigger the sampling module 104 at the predetermined frequency. Use of the samples of the pressure obtained at the predetermined frequency, however, may cause inaccuracy in the control of the pump 32 due to the pressure including the fluctuations described above. Triggering of the sampling module 104 at the adjusted frequency may improve accuracy of the control of the pump 32.

Figure 6:
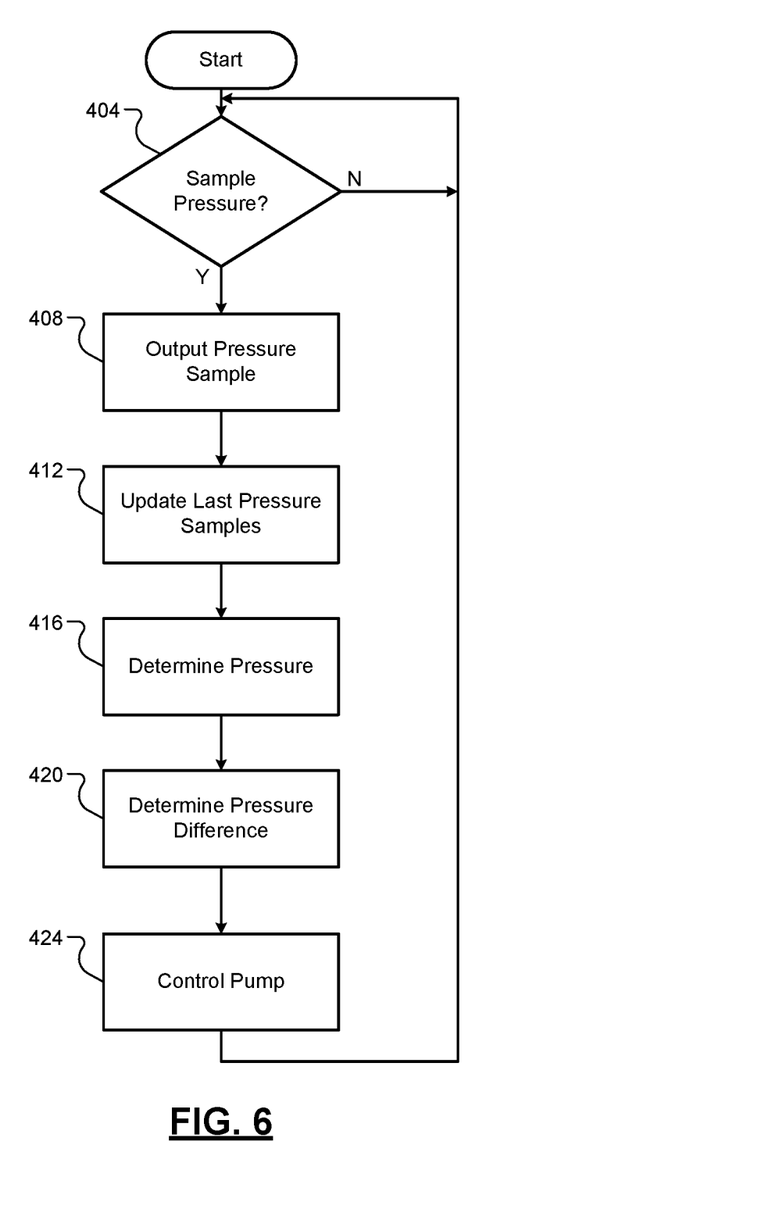
FIG. 6 is a flowchart depicting an example method of determining a measured pressure of DEF at a DEF pressure sensor and controlling a DEF pump based on the measured pressure.

FIG. 6 is a flowchart depicting an example method of determining the measured pressure at the second pressure sensor 40 and controlling the pump 32 based on the measured pressure. Control begins with 404 where the triggering module 108 determines whether to trigger sampling of the pressure from the second pressure sensor 40. For example, the triggering module 108 may determine whether the position of the electric motor 60 has reached one of the predetermined positions (e.g., as in FIGS. 3A and 3B) or based on the adjusted frequency (e.g., as in FIGS. 5A and 5B). If 404 is true, the triggering module 108 triggers the sampling module 104, and control continues with 408. If 404 is false, the triggering module 108 does not trigger the sampling module 104, and control may remain at 404.

At 408, in response to being triggered, the sampling module 104 samples the pressure from the second pressure sensor 40 and outputs the present pressure sample (pressure (n)) accordingly. At 412, the buffer module 112 updates the stored previous pressure sample(s). For example, the buffer module 112 may set the last pressure sample (pressure (n−1)) to the present pressure sample at 408 during the last control loop. Additionally (e.g., as in FIGS. 3B and 5B), the buffer module 112 may set the second to last pressure sample (pressure (n−2)) to the present pressure sample at 408 from two control loops ago (i.e., during the control loop immediately before the last control loop), set the third to last pressure sample (pressure (n−3)) to the present pressure sample at 408 from three control loops ago, etc.

At 416, the measurement module 116 determines the measured pressure based on the present pressure sample (pressure(n)) and the last pressure sample (pressure (n−1)) (e.g., as in FIGS. 3A and 5A). The measurement module 116 may determine the measured pressure further based on one or more other previous pressure samples (pressure (n−1), pressure (n−2), pressure (n−3), pressure (n−4), pressure (n−5), etc.) (e.g., as in FIGS. 3B and 5B). For example, the measurement module 116 may set the measured pressure based on or equal to an average of the present and previous (including last) pressure samples. The measured pressure therefore includes less noise attributable to the cogging torque than the pressure from the second pressure sensor 40.

At 420, the difference module 120 determines the pressure difference based on the target pressure and the measured pressure. Use of the measured pressure (as opposed to the pressure from the second pressure sensor 40) increases an accuracy of control of the pump 32 and more closely achieves the target pressure at the second pressure sensor 40.

At 424, the pump control module 124 controls the speed of the electric motor 60 based on adjusting the pressure difference toward or to zero. For example, the pump control module 124 may control switching of the switches of the motor driver 128 based on the pressure difference. The pump control module 124 may, for example, determine the duty cycle of PWM signals to apply to the switches of the motor driver 128 based on the pressure difference and switch the switches of the motor driver 128 using the PWM signals. The pump control module 124 may determine the duty cycle, for example, using one of a lookup table and an equation that relates pressure difference to duty cycle. Control may then return to 404 for a next control loop.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A diesel emissions fluid (DEF) control system, comprising:
   a DEF injector configured to inject DEF into an exhaust system of a vehicle;
   a DEF pump that includes an electric motor configured to drive a compression mechanism and pump the DEF to the DEF injector;
   a pressure sensor configured to measure a pressure of the DEF output from the DEF pump; and
   a control module comprising:
     a sampling module configured to, based on a rotational position of an output shaft of the electric motor, selectively output samples of the pressure;
     a measurement module configured to determine a measured pressure at the pressure sensor based on a present one of the samples and a last one of the samples output before the present one of the samples; and a pump control module configured to apply power from a power source to the electric motor based on a difference between the measured pressure and a target pressure.

2. The DEF control system of claim 1 wherein the measurement module is configured to set the measured pressure to an average of the present one of the samples and the last one of the samples.

3. The DEF control system of claim 1 wherein the measurement module is configured to set the measured pressure to: (a) a sum of the present one of the samples and the last one of the samples divided by (b) two.

4. The DEF control system of claim 1 wherein the measurement module is configured to determine the measured pressure at the pressure sensor based on the present one of the samples, the last one of the samples, a first previous one of the samples output immediately before the last one of the samples, and a second previous one of the samples output immediately before the first previous one of the samples.

5. The DEF control system of claim 1 wherein the measurement module is configured to determine the measured pressure at the pressure sensor based on the present one of the samples, the last one of the samples, a first previous one of the samples output immediately before the last one of the samples, a second previous one of the samples output immediately before the first previous one of the samples, a third previous one of the samples output immediately before the second previous one of the samples, and a fourth previous one of the samples output immediately before the third previous one of the samples.

6. The DEF control system of claim 5 wherein the measurement module is configured to set the measured pressure at the pressure sensor to an average of: (i) the present one of the samples, (ii) the last one of the samples, (iii) the first previous one of the samples output immediately before the last one of the samples, (iv) the second previous one of the samples output immediately before the first previous one of the samples, (v) the third previous one of the samples output immediately before the second previous one of the samples, and (vi) the fourth previous one of the samples output immediately before the third previous one of the samples.

7. The DEF control system of claim 1 wherein the sampling module is configured to output the samples of the pressure when the rotational position of the output shaft of the electric motor reaches a plurality of predetermined positions, respectively, during a revolution of the electric motor.

8. The DEF control system of claim 7 wherein the predetermined positions correspond to high and low peaks in the pressure.

9. The DEF control system of claim 1 wherein the sampling module is configured to output six of the samples of the pressure when the rotational position of the output shaft of the electric motor reaches six predetermined positions, respectively, during a revolution of the electric motor.

10. The DEF control system of claim 1 wherein the sampling module is configured to output one of the samples of the pressure each 60 degrees of rotation of the rotational position of the output shaft of the electric motor.

11. The DEF control system of claim 1 further comprising a position sensor configured to measure the rotational position of the output shaft of the electric motor.

12. The DEF control system of claim 1 further comprising:

a speed module configured to determine a rotational speed of the electric motor based on the rotational position of the output shaft of the electric motor;
an adjustment module configured to determine a frequency adjustment based on the rotational speed of the electric motor; and
an adjusting module configured to determine an adjusted frequency based on a predetermined frequency and the frequency adjustment,
wherein the sampling module is configured to output the samples of the pressure at the adjusted frequency.

13. The DEF control system of claim 1 wherein the pump control module is configured to apply power from the power source to the electric motor based on adjusting the difference toward or to zero.

14. A diesel emissions fluid (DEF) control method, comprising:

by a DEF injector, injecting DEF into an exhaust system of a vehicle;
by a DEF pump that includes an electric motor configured to drive a compression mechanism, pumping the DEF to the DEF injector;
by a pressure sensor, measuring a pressure of the DEF output from the DEF pump;
based on a rotational position of an output shaft of the electric motor, selectively outputting samples of the pressure;
determining a measured pressure at the pressure sensor based on a present one of the samples and a last one of the samples output before the present one of the samples; and
applying power from a power source to the electric motor based on a difference between the measured pressure and a target pressure.

15. The DEF control method of claim 14 wherein determining the measured pressure at the pressure sensor includes setting the measured pressure to an average of the present one of the samples and the last one of the samples.

16. The DEF control method of claim 14 wherein determining the measured pressure at the pressure sensor includes setting the measured pressure at the pressure sensor to an average of: (i) the present one of the samples, (ii) the last one of the samples, (iii) a first previous one of the samples output immediately before the last one of the samples, (iv) a second previous one of the samples output immediately before the first previous one of the samples, (v) a third previous one of the samples output immediately before the second previous one of the samples, and (vi) a fourth previous one of the samples output immediately before the third previous one of the samples.

17. The DEF control method of claim 14 wherein selectively outputting samples of the pressure includes outputting the samples of the pressure when the rotational position of the output shaft of the electric motor reaches a plurality of predetermined positions, respectively, during a revolution of the electric motor.

18. The DEF control method of claim 14 further comprising, by a position sensor, measuring the rotational position of the output shaft of the electric motor.

19. The DEF control method of claim 14 wherein applying power from the power source to the electric motor includes applying power from the power source to the electric motor based on adjusting the difference toward or to zero.

20. The DEF control method of claim 14 further comprising:

determining a rotational speed of the electric motor based on the rotational position of the output shaft of the electric motor;

determining a frequency adjustment based on the rotational speed of the electric motor; and determining an adjusted frequency based on a predetermined frequency and the frequency adjustment, wherein selectively outputting samples of the pressure includes outputting the samples of the pressure at the adjusted frequency.

* * * * *